Dec. 5, 1933.    M. W. BADEN    1,938,004
PHOTO ELECTRIC ANALYZER APPARATUS
Filed May 20, 1930    2 Sheets-Sheet 2

Inventor
Martin W. Baden,
By
Robt. E. Barry
Attorney

Patented Dec. 5, 1933

1,938,004

UNITED STATES PATENT OFFICE 1,938,004

PHOTO-ELECTRIC ANALYZER APPARATUS

Martin W. Baden, Winfield, Kans.

Application May 20, 1930. Serial No. 454,167

3 Claims. (Cl. 88—14)

This invention relates to an instrument designed to utilize various properties of light in making rapid and accurate chemical analyses, and in investigations of the properties and compositions of matter from which various deductions can be made, such as, for instance, the possibility of oil occurrence in a strata through which an oil well drill is being driven.

Various tests, both physical and chemical, depending on the known laws of light propagation, have been used for many years, some, the spectroscope, interferometer etc., depend very closely on the laws of light itself; this invention, however, utilizes these laws as exhibited more particularly in their relations to matter in certain prepared states, such as colloids, precipitates etc., held in, or carried by, solutions, and either naturally able to cause turbidity, or artificially colored by reagents, as well known in colorimetric chemistry. After this initial preparation, according to known methods in qualitative and quantitative chemistry, this invention enables quick determinations to be made of the percentage compositions of any material, causing turbidity, or exhibiting color, in the solution.

Besides such chemical determinations of precise amounts, the apparatus and processes described herein enable a rapid survey to be made of the probable presence, or absence, of certain suspected, or desired bodies in liquids under test, as, for instance, an indication of an oil emulsion in water, butter fat in milk, etc.

These results are gotten by the application to this character of testing of a light sensitive cell giving readings in comparative variations of electric currents passing through the cell under known standard conditions, and those set up by the material under test, from which readings the nature and amount of material present and causing the variation may be deduced, by consulting a chart or table.

One object of the invention is to enable a photo-electric cell to be operated in various kinds of chemical tests, industrial, bacteriological etc., under direct and absolute electrical control.

Another object is to dispense with lens systems, shutters and indirect measurements of ratios etc., substituting direct action of a light source on the material under test and obtaining a final instrument reading as the object of the test.

Another object is to make a comparative reading immediately follow a standard one, and both on the same light source.

Another object is to enormously increase the sensitivity of this class of testing.

Other objects and advantages of the invention will appear as the description proceeds.

The photo-electric cell used with this invention is known as an alkali metal hydride cell. It is extremely sensitive to variations in the color and intensities of lights, and one of these cells connected in circuit with an electric instrument will cause a considerable difference in the instrument reading, even if only partially shielded by holding the hand in front of it in a well lighted room. For the purposes of this invention, these cells have two important characteristics, viz: the current they pass is directly proportional to the intensity of illumination, and to the area of illumination. In this invention, great care is taken to keep both these factors absolutely the same throughout a given test period, which moreover is made extremely short. Because of the constance of the two factors mentioned, any variation in current flow must necessarily result from differences in the properties, or quantities, of two materials tested successively under exactly the same conditions to give comparative readings. If the two materials were the same, and in the same amount, the readings would be alike.

There are two general classes of alkali metal hydride cells, the vacuum type, as the name implies, contains no gas. The gas filled cell however, is filled to a low pressure with an inert gas such as helium, argon or neon. In this type of cell, the photo generated electrons ionize this gas in their passage from the sensitive cathode surface to the anode. The resulting ionization current is added to the electron current, giving a larger total photo-electric current than in the vacuum type of cell. Photo-electric cells of maximum sensitivity are therefore of the gas filled type.

Figure 2:
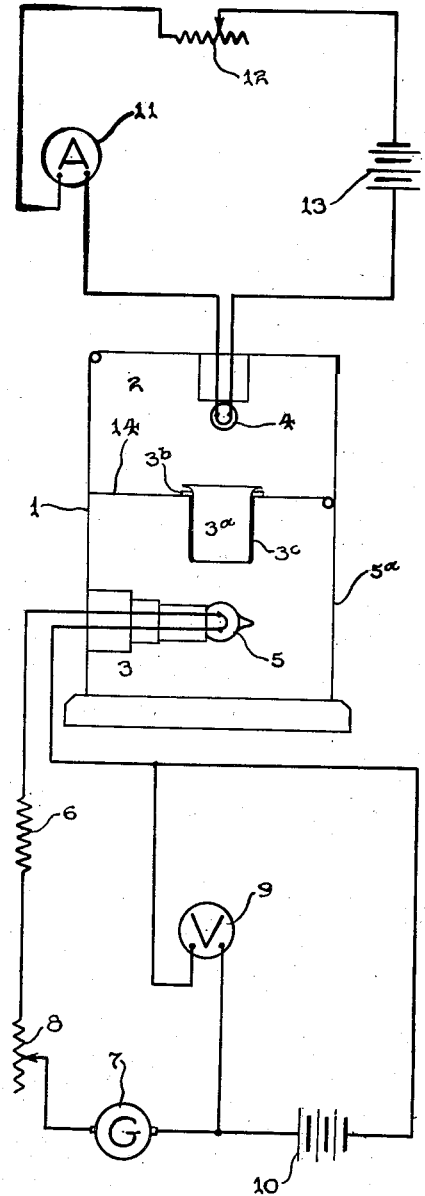
Fig. 2 is a diagram of electrical connections used in one form of the invention.

Various gas pressures are used in the gas filled type of cell. Cells which are filled to the proper pressure of maximum sensitivity, i. e., to give maximum current flow per unit of illumination, are not intended to carry as large currents as those which are filled at other pressures. Thus, in selecting a cell for use with very low illumination, a maximum sensitivity cell should be used, whereas if greater light intensity and larger current are required, another cell is more suitable. It has been found by experience that for most general purposes, the G.-M. photo-electric cell No. 1005 gives best results. This cell is a compromise between the high current and high sensitivity types. The theory and operation of the cell forbids its use as a heavy current device and such use is furthermore needless and not advisable in the delicate tests in which these cells are used, as will be noted from the constants of the circuits shown in Figs. 2 and 3. In Fig. 2, the resistance 6 is of 10,000 ohms, and the resistance of the audion tube 20 of Fig. 3 closely approaches that amount.

Figure 3:
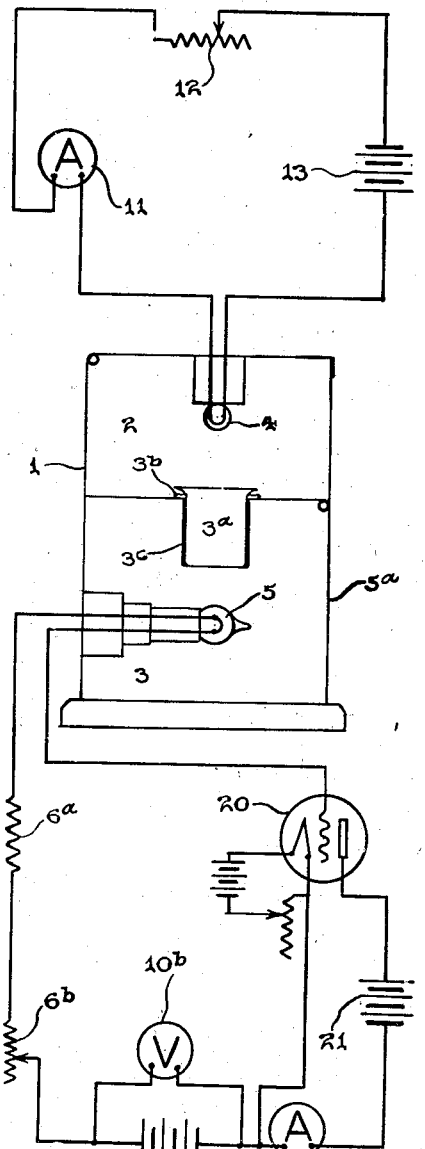
Fig. 3 is a similar diagram of another form of the invention.

The galvanometer 7, Fig. 2, used to measure current through the photo-cell, is a reflecting galvanometer such as commonly used in electrical laboratories. It should have a current sensitivity of between $10^{-7}$ and $10^{-9}$ amperes per scale division. Before starting a test, this galvanometer should be brought to zero reading, by adjustment of a permanent magnet control field, or otherwise as provided in its design. In Fig. 3 form of the invention, the photo-cell practically exerts only a potential control, so the instrument will always be at zero, and may be an ordinary micro-ammeter, giving dead beat readings.

Referring to Fig. 2 as illustrating one form of the invention, with the several elements connected up for a test. A light tight box 1 is divided into two compartments 2 and 3 by a division plate 14, which has an aperture into which a glass beaker 3a may be placed, with its lip resting on a felt gasket 3b, surrounding the edge of the aperture, and serving as a light seal between the two compartments 2 and 3, when the beaker is in place.

The compartment 2 has a lamp socket carried by its top plate, which is hinged to the frame of the box 1. A small electric lamp 4 fits the socket, its axis when in the socket being in a line with the center of the aperture of plate 14. The purpose of hinging the top plate is to give ready access to the lamp 4, and also permit of placing a beaker in the aperture, or removing it therefrom.

Compartment 3 also has a lamp socket, which is carried on a side wall of box 1, this socket may be an ordinary radio tube socket, it serves to receive and energize a phototube 5, which constitutes the light sensitive cell referred to above. The axis of this cell is placed to contain a straight line passing through lamp 4 and the center of the beaker aperture. Directly opposite the cell mounting there is a hinged door 5a in the side of box 1 to give access to the compartment. When closed, the door forms a perfect light seal so that the only light that can fall on tube 5 must come through the beaker aperture in division plate 14. It is further apparent that light passing through a beaker from lamp 4 will strike directly on the surface of a fluid contained therein, and that in leaving the beaker it passes through a substantially plane face. The side walls of the beaker may be covered with an opaque coating 3c, preferably on the outside, and after the beaker has been graduated to show from the inside.

A test box, fitted up as above described, is connected to electric circuits running to each lamp socket. The circuit connected to the socket of compartment 2 has a source of potential 13, which may be a standard form of 6 volt storage cell, such as designed for radio A battery circuits to give a very steady current flow. This circuit further has a small D. C. ammeter 11 reading up to 1 ampere, and a series resistance 12, which can be closely regulated to control the brightness of lamp 4.

The circuit connected to the socket in compartment 3 of the box 1 includes a source of potential 10, which may be what is known in the radio art as a B battery. It should have an initial potential of 145 volts. As shown in Fig. 2, the battery 10 is connected in series with a 10,000 ohm resistance coil 6, such as is commonly used in Wheatstone bridge sets, and a small regulable resistance 8, used to put exactly the right optimum potential on the photo-cell 5. All parts of the circuit connected to the cell socket must be very carefully insulated. Its potential is determined by a D. C. voltmeter 9 connected across the terminals of battery 10, during a test and serving as a potentiometer connection. The very small current that flows in the circuit is measured by a reflecting galvanometer 7, the use of which will be well known to persons acquainted with electrical testing.

The form of the invention shown in Fig. 3 is similar to that of Fig. 2 insofar as the light tight box and the lamp circuit of the upper lamp 4 is concerned. The circuit of the photo-cell has, however, been considerably modified to substitute a potential audion control for the direct current flow of the cell circuit used in Fig. 2. This change permits a less expensive series resistance to be used in the cell circuit and also gives a dead beat reading in the plate circuit of the audion tube, in which an ordinary micro-ammeter can be connected costing much less than a reflecting galvanometer, and requiring less skill to operate. The grid circuit including the photo-cell, is energized by a 145 volt B battery 10a circuit, bridged by a 150 volt D. C. voltmeter 10b as shown. A permanent series resistance 6a of 1000 ohms, may be used and a small regulator resistance 6b up to 100 ohms, these values depending on the particular cell. The battery 21 used in the audion plate circuit can be the ordinary 22 volt battery commonly used on detector cells. All parts of the photo-cell circuit must be very carefully insulated in this form of the invention also.

Figure 1:
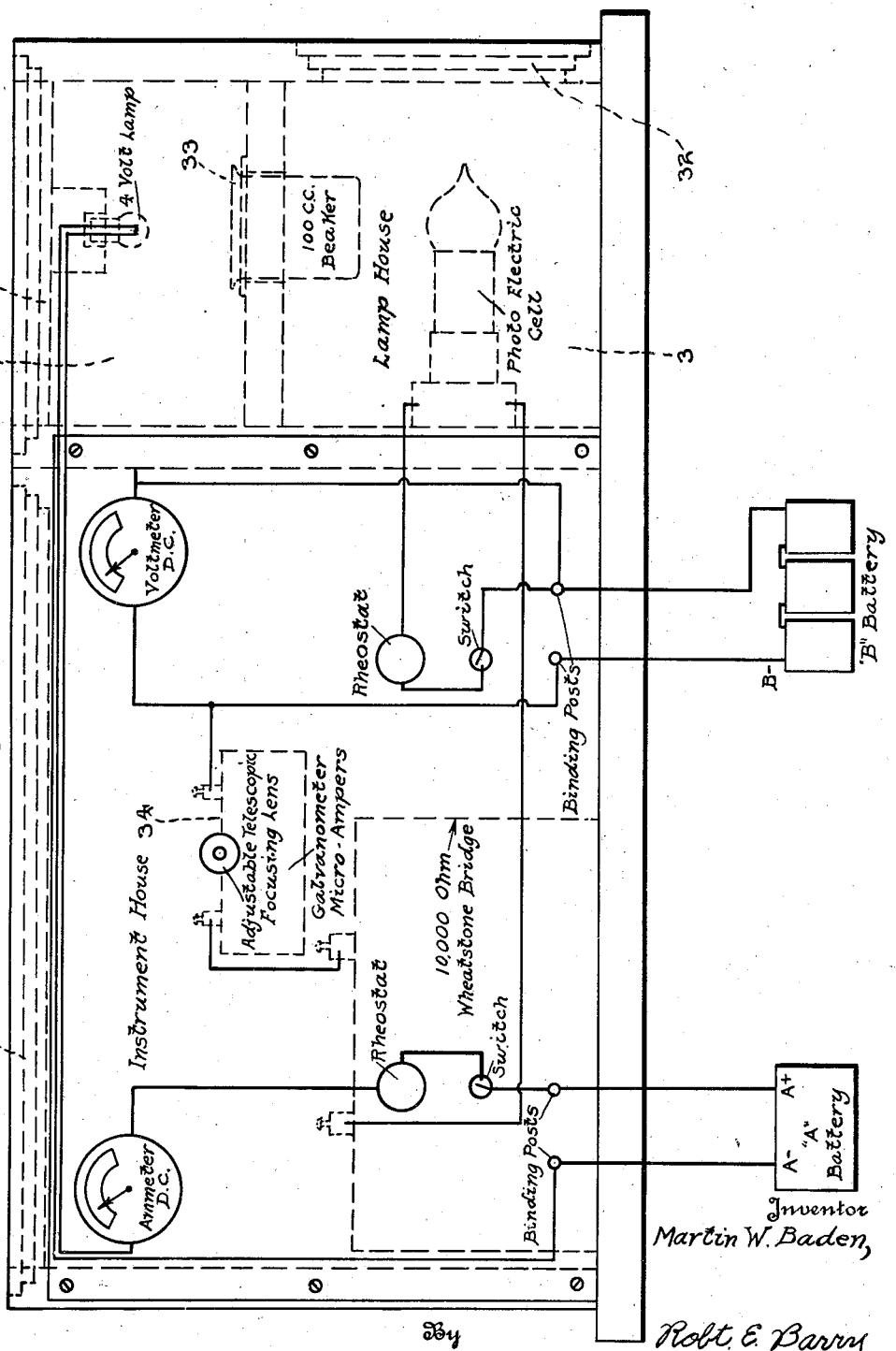
Fig. 1 is a front elevation of a cabinet in which the several parts of my invention are indicated diagrammatically.

Fig. 1 gives a general assembly view of the form of the invention diagrammed in Fig. 2, as fitted up in a cabinet for portable use. It shows hinged top doors 30, 31 to each compartment and a hinged side door 32 to the cell compartment. To conduct a test, the top door 31 of the lamp compartment is raised and a beaker 33 carrying a solution, or matter in colloidal state, placed in position in the aperture of the division plate, where it will be in the direct path of light from the lamp.

As preliminary to the test of the actual material investigated, the reflecting galvanometer 34 is brought to zero reading and otherwise adjusted as known to users of these galvanometers. The beaker is then put in its seat in the division plate, filled with a given quantity of distilled water, and a reading taken of the deflection under these conditions, with the photo-cell under correct voltage, and the lamp at right illumination, as to intensity and spacing from the surface of the distilled water.

Keeping all conditions the same, the contents of the beaker is changed by the substitution of a like volume of liquid charged with the material under test, and a new reading is taken on the galvanometer. The difference in the two readings indicates to what extent the passage of light has been impeded and on reference to a chart, or a table, based on a series of standardized tests, conducted for that purpose, the difference of the two readings serves as a key index to deduce the nature of the material tested, and also its percentage amount in the liquid vehicle in the beaker; generally distilled water; but other solvents, or carriers can be used as a vehicle. Also, the methods of microscopic analysis, involving thin slicing of solids, and flow of film sections of liquids.

The test is of quite general application and fundamentally is presented when light from a steady source of illumination is passed directly through material tested and compared with readings under like conditions through a supporting member of very small impedance to light passage, like the beaker, partly filled with pure distilled water, above referred to. The only function of the beaker is to serve as a support for the material under test while in a particular state of matter, such as the excessively fine particles of the colloidal state, and the purpose of using a comparative reading is to eliminate the disturbing effect of the member (beaker) used as a container, or support, for the material under test.

The preparation of the material under examination, and its isolation to a pure state follows the usual methods of analytic chemistry, leading finally to a determination by reason of turbidity effect on the beaker liquid, or to a like result because of change in color, either natural or artificial, produced by the reagents of colorimetric chemistry. As noted above, the actual test reading is based on the direct incidence of light on the surface of the liquid in the beaker, the bottom of which may be considered simply as a supporting plane, offering practically no impedance to light transmission.

Turbidity and color tests, as affecting light transmission, have been applied to the rough analysis of liquids used in a wide range of industrial, medical and artistic applications, as indicating various properties, or states, or admixtures of sediment etc. In some arts, when supplemented by years of acquired skill, these tests, even by the eye alone, have been of extraordinary reliability and service. An experienced observer can tell at a glance innumerable facts, relating to materials worked, simply by the play of light thereon, or its transmission through it. The instrument of this invention brings to bear on such examinations a power of observation that is many times as sensitive as the unaided eye, with an instantaneously made record that can always be referred to later, for comparison or possible modification indicative of improvements or deteriorations.

In the field of quantitative chemical analysis, once a series of tests has been run for any given element or compound, and recorded continuously on a chart or table of interpolated values, any future tests of known like materials can readily be translated into percentage compositions, either of weight or volume. Such tables or charts can be prepared for each of the chemical elements and its principal compounds; for instance, if as the result of chemical isolation it was known that some form of silicon had produced the galvanometer reading, a reference to a table containing the instrument constants for silicon and its compounds would give at the value of the galvanometer reading the corresponding parts in a million of all the silicon compounds that could produce such a reading, then if in addition the beaker was known to contain a certain number of parts in a million when charged for test, the particular compound sought could be identified by formula and amount in parts per million.

Many tests can be practiced requiring simply the agreement with, or departure from a curve of known characteristics for instance, in logging an oil well drive, it is known, particularly in a certain section of the country, that some strata are more favorable indications than others. Accordingly, if a curve of a log that has been prepared from borings of a successful well is being duplicated it is highly probable that the bit is working to the same sands, because, even though the inclines are distorted in a different location, an orderly sequence of the same materials indicates that the strata remain essentially the same. The instrument of this invention gives an incomparable means for certainly and rapidly identifying such a succession of strata.

An important feature of the invention resides in the fact that the reading does not depend on the absolute illuminating power of the source of light, the illuminating power should, and easily can be made constant within very narrow limits, but even if it changes considerably, from time to time, the tests being based on comparative readings of practically simultaneous, or more correctly, immediately successive exposures, it follows that the source will be constant for that particular test.

Another important feature is found in the correctness of the readings when taken by persons of slight skill and experience. It takes years of experience for a still man to be able to fill a test tube with distillate and assign it at once to its correct range, simply by inspecting its light transmission properties. This instrument gives such results as a matter of figures, from which the further handling of the still can be directed. Results of this character are especially important in making a diagnosis, based on light effects on abnormal excretions, sugar examinations, fluids, dye working, etc.

While I have illustrated the invention in connection with light from an ordinary incandescent lamp, as a test source of light, the invention affords a ready means for applying many principles known to be useful in testing out the nature and properties of materials. Instead of using the light directly from the lamp itself, it may be modified, to accomplish a particular result, by passing it through a light filter, breaking it up on a diffraction grating, etc., to subject the material under test to the action of a given range of light wave lengths, or light of a particular color.

The test source of light may also be varied by substituting different sources, such as arcs of various kinds, especially the mono-chromatic light obtained from the mercury vapor tube, and when using such tubes they may be of quartz to give radiation rich in ultra-violet rays, which have been found to give remarkable results in the microscopic photography of certain materials.

Furthermore, light from a source of known characteristics may be passed from the source through the material under test, and then varied by causing it to traverse optical modifying apparatus, such as a Nichol prism as a polarizer, or materials having different absorption characteristics.

Instead of causing the light to act on the cell by direct transmission through the material under test, as illustrated, the material while under illumination, can be so mounted in relation to screens which may be apertured that it sets up a general diffusion, determined by the size and position of the screens and the walls of the test box.

The above indications of possible variations shows the extreme adaptability of the apparatus as a research instrument that can be made auxiliary to many different kinds of investigations.

While I have disclosed what I now consider to be preferred embodiments of the invention in such manner that the same may be readily understood by those skilled in the art, I am aware that changes may be made in the details disclosed, without departing from the spirit of the invention, as expressed in the claims.

What I claim and desire to secure by Letters Patent is:

1. In a photometer, a light sealed box having an apertured horizontally opaque partition wall providing two superposed chambers, a source of light in one chamber, a light sensitive cell in the other chamber, and a cup-like support for material under test arranged in the partition aperture whereby light from said source can illuminate the cell.

2. A photometric apparatus comprising a light sensitive cell, a light source, light excluding enclosures for the cell and the light source, electrical means for maintaining the intensity of the source of light at a fixed value, and a removable cup-like holder for test material let into the enclosures and limiting the passage of light from the light source to the cell to the horizontal sectional area of the holder, a circuit, and an electrical measuring instrument in said circuit for indicating variations of the flow of current through said cell, and an adjustable resistance in said circuit.

3. A photometric measuring device comprising a box having an open top and a light excluding door movably mounted in the open top, an opaque partition dividing the box into two superposed chambers, an illuminating device in one chamber, a light sensitive device in the other chamber, one of said devices being carried by said door, and a holder for test material carried by the partition and arranged in vertical line with said devices.

MARTIN W. BADEN.